United States Patent Office 3,350,333
Patented Oct. 31, 1967

3,350,333
FREE-FLOWING PARTICULATE POLYVINYL CHLORIDE BLENDS
Ludwig A. Beer, Agawam, and Edgar E. Hardy, Longmeadow, Mass., assignors to Monsanto Company, a corporation of Delaware
No Drawing. Filed Oct. 5, 1962, Ser. No. 228,737
7 Claims. (Cl. 260—22)

This invention relates to polyblends, and more particularly to blends of vinyl chloride polymers, an isocyanate-terminated polyester prepolymer and a difunctional component.

In order to improve the physical and thermal properties of unplasticized vinyl chloride polymers, they are generally blended with rubbery elastomeric materials such as butadiene/acrylonitrile rubbers, butadiene/fumarate copolymers, ethylene/vinyl acetate copolymers, chlorinated polyethylene and the like. Unfortunately, due to the unsaturated nature of the rubbery components, the physical blends tend to be sensitive to oxidation during processing and utilization. On the other hand, physical blends of unplasticized vinyl chloride polymers with saturated elastomeric materials tends to be detrimentally sensitive to mineral oils and hydrocarbon solvents due to the hydrocarbon structure of the saturated elastomeric component.

It was found that polyester urethanes as the elastomeric component of polyvinyl chloride polyblends will contribute the necessary physical and thermal properties without the undesirable effects of oxidation and sensitivity to mineral oils and hydrocarbon solvents. However, the solid polyester urethane elastomers are produced with some difficulty and at high costs, thereby restricting commercial use. In addition, the blending of polyester urethane with vinyl chloride polymers is less than satisfactory in terms of the milling requirements, homogeneity of the final product and degradation of product components. Finally, urethanes are very sensitive to moisture, including atmospheric moisture, at the high temperatures required for fusion blending of the urethane component with vinyl chloride polymers, resulting in a partial breakdown of the urethane molecular chain and the formation of carbon dioxide gas.

Accordingly, it is an object of this invention to provide vinyl chloride polymer blends having improved physical properties.

Another object of this invention is to provide a low temperature process for preparing vinyl chloride polymer blends having improved physical and rheological properties, which process can be carried out in conventional blending equipment.

These and other objects are attained by intimately mixing 60–93 parts by weight of a porous vinyl chloride polymer at temperatures below the fusion point of said polymer with 40–7 parts by weight total of two other components comprising (1) an isocyanate-terminated polyester prepolymer and (2) a difunctional organic compound selected from the group consisting of diols, diamines, amino-alcohols and mixtures of the same. Tall oil may be used in partial substitution for the prepolymer and the difunctional organic compound.

The following examples are given to illustrate the invention and are not intended as a limitation thereof, and unless otherwise specified, quantities are mentioned on a weight basis.

*Example 1*

Fifteen hundred parts of a polyvinyl chloride suspension resin with a specific viscosity of 0.53 and a particle porosity of 0.25 cc./gram is preheated in a Baker Perkins mixer for 15 minutes. The heating medium is controlled to maintain the resin temperature below 75° C.

A mixture of 192.5 parts of an isocyanate-terminated polyester prepolymer prepared by reacting 11 mols of ethylene glycol and 10 mols of adipic acid with sufficient 4,4'-diphenyl methane diisocyanate to produce a prepolymer having about 6.3 to 6.7% isocyanate radical content and 11.9 parts of anhydrous 1,4-butanediol, which mixture has been vigorously stirred for 1 minute at 75° C. is gradually added to the preheated polyvinyl chloride resin while the resin is being mixed.

After the addition of the above mixture has been completed, the temperature of the blend is raised to 95° C. and maintained at that temperature, during continuous mixing for a period of time as specified below. This period of time is referred to below as the "dry-blending" period.

Thereafter, while continuing the mixing operation, the resulting dry blend is cooled to room temperature and 30 parts of tin mercaptide (stabilizer) and 7.5 parts of stearic acid (lubricant) are added and admixed.

Three dry blends are prepared in the above manner except that each is maintained at 95° C. for different specified periods of time, namely, 15, 30, and 45 minutes respectively after which samples are taken. The samples taken from the three blends or batches are each divided into two portions. One portion of each batch sample is fused on a two-roll mill at 175° C. and additional samples taken after 5, 15, and 25-minute intervals. These samples will be hereinafter referred to as "milled" samples. The other portion of each batch sample is compression-molded at 185° C. under pressures of 5000 p.s.i. to form smooth-surfaced flat slabs. These samples will be hereinafter referred to as molded samples. The milled samples and molded samples are then tested and are found to have the properties listed in Table I.

TABLE I

| Properties | Dry Blend Period, Minutes at 95° C. | | |
|---|---|---|---|
|  | 15 | 30 | 45 |
| Impact Strength, ft. lbs./in. of notch: |  |  |  |
| 5-min. Milled Sample | 12.7 | 20.8 | 21.6 |
| 15-min. Milled Sample | 10.5 | 19.5 | 19.2 |
| 25-min. Milled Sample | 14.0 | 21.6 | 22.7 |
| 5-min. Molded Sample | 23.9 | 26.9 | 27.1 |
| 25-min. Molded Sample | 25.3 | 25.5 | 26.7 |
| Heat Distortion ° C. (25-min. Molded Sample): 10-mil deflection at 264 p.s.i. | 67 | 68.5 | 68.8 |
| Shore "D" Hardness: 25-min. Molded Sample | 73 | 73 | 73 |
| Yield Values: |  |  |  |
| 25-min. Molded Sample—Tensile Strength, p.s.i. | 5,850 | 5,840 | 5,770 |
| Percent Elongation | 4.6 | 4.7 | 4.7 |
| Modulus, p.s.i.×10⁵ | 2.4 | 2.6 | 2.6 |

In the above example, impact strength determinations are run on milled samples as well as on molded samples. As some blends may have good impact strength in pressed moldings and not in the milled sheets, both types of samples are tested. A blend not developing good impact on the mill, although showing excellent impact properties on press-molded material, would not be expected to produce good impact material on extrusion or injection molding. Also, impact strength versus milling time is a good indicator of the stability of a particular blend. Milled samples, taken after 5, 15 and 25-minute milling, show that impact strength develops quickly and remains substantially constant during prolonged milling for all levels. A substantial improvement in impact strength is shown in the above tabulation for milled samples taken from batches dry-blended for 30 minutes or more at 95° C. Impact strength measurements obtained from molded samples are excellent for all blends.

Example II

Seven blends are made up in the following manner: Ninety parts of a polyvinyl chloride suspension resin with a specific viscosity of 0.53 and a particle porosity of 0.25 cc./gram are preheated in a Baker Perkins mixer for 15 minutes. The heating medium is controlled to maintain the resin temperature below 75° C.

To each 90-part portion of polyvinyl chloride resin prepared in the above manner are added 10 parts of one of the individual mixtures indicated below while maintaining continuous mixing. Each mixture contains varying amounts of the isocyanate-terminated polyester prepolymer prepared as in Example I, anhydrous 1,4-butanediol and tall oil which is vigorously stirred for 1 minute at 75° C. before addition.

MIXTURES.—PROPORTIONS IN PARTS BY WEIGHT

| Mixture No. | Polyester | Butanediol | Tall Oil |
|---|---|---|---|
| 1 | 100 | 7 | 0 |
| 2 | 100 | 7 | 10 |
| 3 | 100 | 7 | 20 |
| 4 | 100 | 7 | 30 |
| 5 | 100 | 7 | 40 |
| 6 | 100 | 7 | 50 |

After addition of each of the above mixtures to the resin, 2 parts of tin mercaptide stabilizer and 1 part of calcium stearate are added to each blend and thoroughly admixed.

After preparation of the above dry blends, samples are taken from Blends 1–6 and each sample is fused on a 2-roll mill at 175° C.

Izod impact strength of mill strips after 5 minutes of milling are as follows:

| Blend No. | 1 | 2 | 3 | 5 | 5 | 6 |
|---|---|---|---|---|---|---|
| Impact Strength, ft. lbs./in. of notch. | 22.7 | 21.3 | 18.6 | 19.0 | 15.8 | 4.0 |
| Heat Distortion Temp., ° C., 10-mil. defl. at 264 p.s.i. | 63.7 | 64.4 | 65.3 | 64.4 | | |

As shown by the data, elastomers extended with high levels of cheap tall oil still yield good quality polyblends thereby allowing a sizable reduction of urethane cost. Impact strength is essentially retained in the samples containing up to 40 parts of tall oil per 100 parts of the isocyanate-terminated polyester prepolymer (Samples 1–5).

Example III

Two different blends are prepared in the same manner and proportions as mixtures 1 and 4 respectively of Example II except that the prepolymer is an isocyanate-terminated polyether prepared by reacting a mixture of 47 parts of polypropylene glycol (molecular weight about 2000) and about 31 parts of polyether triol obtained from glycerine and propylene oxide (molecular weight about 3000), with 23 parts of 2,4 tolylene diisocyanate. Both blends were fused on a two-roll mill at 175° C. yielding sheets of inferior hot tear strength and thermoplasticity. Izod impact strength of the mill strips for both blends after 5 and 15 minutes milling are shown in the following Table II. Blends 1a and 4a are in the same proportions as blend mixtures 1 and 4 respectively of Example II.

TABLE II

| | Blend | Minutes (5) | Milling (15) |
|---|---|---|---|
| Impact Strength | 1a | 1.4 | 2.0 |
| Ft. lbs./in. of notch | 4a | 3.1 | 3.5 |

As indicated in Table II, blends utilizing polyether prepolymers exhibit a high level of incompatibility with vinyl chloride polymers.

In the process for preparing the featured blends such as described in Example I, the isocyanate-terminated polyester prepolymer and the difunctional organic compound are added, in liquid form, to the porous vinyl chloride polymer to permit absorption essentially within the pores of the vinyl chloride polymer. Reaction between the isocyanate-terminated polyester and the difunctional organic compound proceeds predominantly within the resin pores such that a polyblend is obtained in free-flowing granular form suitable for direct extruder feed and other molding applications. In addition, some interaction may occur with the vinyl chloride polymer itself.

In Example I, the polyvinyl chloride suspension resin is heated to 95° C. after the addition of the prepolymer and the difunctional organic compound. This is done to increase both the rate of penetration and the rate and degree of polymerization of these two constituents within the pores of the vinyl chloride polymers. If desired, the temperature of blending can be maintained at 75° C. or lower, although it may be necessary to increase the dry-blending period to obtain impact results equivalent to that shown for a 30-minute dry-blending period (at 95° C.) in Table I.

The minimum dry blending time at any particular temperautre can be fairly established by a reactivity test performed on a mixture of the desired proportions of the isocyanate-terminated polyester prepolymer and the difunctional organic compound. This test, in essence, measures the change in viscosity of the mixture at a desired temperature. A typical illustration of this method is set forth in the following Example IV.

Example IV

A mixture of 100 parts of the isocyanate-terminated polyester prepolymer prepared as in Example I and 7 parts of 1,4-butanediol are heated to 75° C. and viscosity measurements are taken at unit intervals of time using a Brookfield viscometer (Spindle No. 7, set at 50 r.p.m.). The following viscosity measurements in Table III illustrate the typical rate of change under these conditions.

TABLE III

| Time (minutes): | Apparent viscosity (Poises) |
|---|---|
| 0 | 92 |
| 1 | 83 |
| 3 | 49 |
| 5 | 48 |
| 7 | 77 |
| 9 | 144 |
| 11 | 314 |
| 13 | 706 |
| 15 | 1570 |

This test is important as optimum blending conditions can be established on a small scale without utilizing and subsequently wasting polyvinyl polymer materials. If the temperature of the mixture is maintained below 75° C., the rate of viscosity increase will be diminished and longer periods of blending with the vinyl chloride polymer will be required to reach the same endpoints. For the above Example IV, the dry blending period should be at least 15 minutes. 30 minutes is generally suitable in most instances where temperatures are above 50° C.

Although the prepolymer and the organic difunctional compound may be added to the vinyl chloride polymer separately, a more uniform blend is generally achieved by simultaneous addition individually or after premixing. If the components are premixed, viscosity data such as shown in Table III is useful for determining the maximum premixing time before addition to the vinyl chloride polymer including the maximum length of time for addition. For proper absorption, it is important that the prepolymer-difunctional compound premix be added to the blend while it is still low in viscosity and definitely before gelation.

In addition to temperature, the rate of viscosity change can be further regulated by catalysts or retarders. Typical catalysts would include tertiary amines and many metal compounds such as cobalt naphthenate and stannous octoate. Acidic materials such as hydrochloric acid, benzoyl chloride, citric acid increase the gelation time.

For optimum penetration and absorption of the prepolymer and the difunctional organic compound, the vinyl chloride polymer should have a porosity over about 0.1 cc./gram and preferably from about 0.15 to 0.45 cc./gram. If the porosity falls below 0.1 cc./gram, loss in blend uniformity is experienced resulting in a general decay of physical properties.

The porous vinyl chloride polymers which are blended with the polyester urethane elastomers in the practice of the invention are polymers consisting of 85–100% by weight of a combined vinyl chloride and up to 15% by weight of one or more combined copolymerizable monomers, e.g. vinyl acetate, vinylidene chloride, acrylonitrile, diethyl maleate, dibutyl maleate, diethyl fumarate, acrylate and methacrylate esters such as methyl acrylate, ethyl acrylate, methyl methacrylate, butyl methacrylate, etct. Porous vinyl chloride polymers are generally prepared by the suspension polymerization process as opposed to the emulsion or solvent systems. A suitable suspension polymerization process would be one wherein vinyl chloride is dispersed in water at elevated temperatures in the presence of a suitable suspending agent such as polyvinyl alcohol and methyl cellulose and an agent which controls to a certain extent the degree of porosity of the finally polymerized vinyl chloride such as monomer soluble organic solvents which are nonsolvents for polyvinyl chloride such as saturated hydrocarbons, alcohols, polyoxy esters, etc. The invention is particularly applicable to the modification of porous vinyl chloride polymers having number average molecular weights of 30,000 to 150,000 and more preferably, to number average molecular weights in the range of 30,000 to 75,000.

The isocyanate-terminated polyester prepolymers used in the practice of this invention are generally prepared by reacting linear or substantially linear polyesters with an excess of an organic diisocyanate compound. Particularly suitable prepolymers are those based on polyesters prepared from glycols such as ethylene glycol and aliphatic polymethylene dicarboxylic acids such as adipic acid and with hydroxyl groups ranging between 0.6 to 2.4%. The quantity of the organic diisocyanate utilized should be in excess and sufficient to produce a prepolymer having about 6.3 to 6.7% isocyanate radical content. Furthermore, in order to properly blend the polyester with the vinyl chloride polymer, the preparation of the isocyanate-terminated polyester prepolymer must result in a product that is liquid at the blending temperatures. Consequently, the weight average molecular weight of the polyester prepoylmer should be below 5000, and more preferably, below 3000. The linear or substantially linear polyesters are preferably prepared by the condensation of one or more dihydric alcohols with one or more aliphatic dibasic carboxylic acids. If desired, non-cyclic-forming hydroxy carboxylic acids may be condensed to form the polyester. As dihydric alcohols there may be mentioned ethylene glycol, 1,2-propylene glycol, 1,3-butylene glycol, 1,4-butanediol, 1,6-hexanediol, methyl hexane 1,6-diol, 1,4-butenediol, diethylene glycol, thiodyglycol, 2,2-dimethyl-1,3-propylene glycol, and the like. As aliphatic acids there may be mentioned malonic, succinic, adipic, methyladipic, maleic, dihydromuconic, sebacic, suberic and the like. The diisocyanate compounds that may be used in preparation of the isocyanate-terminated polyester prepolymers used in this invention have the general formula:

$$O=C=N-R-N=C=O$$

wherein R is independently selected from the group consisting of alkyl, aralkyl, aryl and alkaryl radicals having from 2 to 14 carbon atoms. As examples of diisocyanates, there may be mentioned tetramethylene diisocyanate, pentamethylene diisocyanate, hexamethylene diisocyanate, decamethylene diisocyanate, thiodipropyl diisocyanate, p,p'-diphenyl methane diisocyanate, meta-xylene diisocyanate, benzidine diisocyanate, phenylene diisocyanate, chlorophenylene diisocyanate, tolylene diisocyanate, naphthylene diisocyanate, and the like. A particularly preferred diisocyanate compound is 4,4'-diphenylmethane diisocyanate. As mentioned above, the isocyanate-terminated polyester prepolymer formed by the reaction of polyesters and diisocyanate compounds must be liquid at blending temperatures. Consequently, the selection of the particular components and the extent of the reaction are controlled to limit the weight average molecular weight of the isocyanate-terminated polyester prepolymer.

The difunctional organic compounds used in the practice of this invention are selected from the group consisting of diols, diamines, amino-alcohols and mixtures of the same. The quantity of the difunctional compound used in the blending operation should be based on the available NCO groups in the prepolymer. For optimum results the ratio of NCO groups to functional groups (OH) and/or (NH$_2$) should range between 1.01 and 1.2 and more preferably 1.01 and 1.15. The difunctional compound is preferably a diol and more preferably butanediol. However, other difunctional compounds may be used and examples of diols that may be used in the practice of the invention are ethylene glycol, 1,2-propylene glycol, 1,3-propylene glycol, 1,3-butylene glycol, 1,4-butylene glycol, 1,6-hexane diol, methyl hexane-1,6 diol, 1,4-butene diol, diethylene glycol, thiodiglycol, 2,2'-dimethyl-1,3-propylene glycol, and mixtures of the same. Examples of diamines that may be used in the practice of the invention are ethylene diamine, phenylene diamine, naphthalene diamine, piperazine, 1,4-butylene diamine. If desired difunctional compounds containing both the hydroxyl and amino groups may be used. In addition, mixtures of these compounds may also be employed, e.g., a mixture of equal parts of 1,4-butylene glycol and 1,4-butylene diamine. Examples of amino-alcohols that may be used in the practice of the invention are amino-ethyl-alcohol, 2,2-dimethyl-propanol-amine, and the like. In general, the difunctional compounds that may be used in this invention have the general formula:

$$R-A-R'$$

wherein A is independently selected from the group consisting of alkyl, aralkyl, aryl and alkaryl radicals having from 2 to 14 carbon atoms, and R and R' are independently selected as an amino or hydroxyl group.

An economic control of total raw material cost can be achieved by addition of a reactive, low cost diluent, such as crude tall oil. Tall oil is a byproduct in the manufacture of kraft paper from pine or fir wood and is generally considered to be a mixture of fatty acids, rosin acids, and unsaponifiable materials. Tall oil is preferred in the present invention as a substitutional component since part of the properties contributed by this component is due to the esterification of substantial amounts of rosin acids. However, the quantity of tall oil used should not exceed about 55 percent or more preferably 50% of the total weight of the prepolymer and the difunctional organic compound or else the blend will tend to be cheesy and exude unreacted tall oil.

The polymer mixtures of the invention are generally prepared by intimately mixing isocyanate-terminated prepolymers and difunctional organic compounds with preheated porous vinyl chloride polymers at temperatures below the fusion point of the vinyl chloride polymer and preferably below 100° C. Ordinarily, this intimate mixture is accomplished by mixing the polymers in a machine of the type normally used for blending plastics, e.g., a Baker-Perkins mixer, Reed, ribbon blender or screw conveyor.

A heat stabilizer is preferably incorporated with the vinyl chloride polymer to minimize thermal degradation during processing. Suitable stabilizers are those normally used to stabilize vinyl chloride polymers against thermal degradation, e.g., hydrous tribasic lead sulfate, tin mercaptide, barium-cadmium complexes, etc.

Optional additives such as fillers, colorants, processing aids, lubricants, co-plasticizers, etc. can be incorporated into the blends if desired. Among the processing aids and co-plasticizers suitable for incorporation into the blends are, e.g., styrene-acrylonitrile copolymers, styrene-methyl methacrylate copolymers, epoxy compounds, etc., including small quantities of conventional primary and secondary polyvinyl chloride plasticizers.

The blends obtained by the process set forth above are in a free-flowing fine granular form which permits direct feed to extruders, without the need for prior compounding, dicing, chopping, pelleting or other homogenizing and conditioning step.

The products of the invention are rigid or semi-rigid compositions which are useful in preparing sheets, tubes, and molded objects having high impact strength. In addition, these compositions possess excellent water, oil, gasoline and detergent resistance making them particularly desirable for applications in bottles and other packaging systems. They are also characterized by good flow properties at relatively low processing temperatures, high heat distortion point, good chemical resistance, and good tensile strength. Examination of samples of the compositions withdrawn from a roll mix after milling times of 5, 15 and 25 minutes, shows that they can withstand relatively long milling times without undergoing thermal degradation. They may be calendered, injection-molded, extruded or otherwise fabricated, usually at temperatures of about 150–200° C., to form rigid sheets, pipes, structural pieces, wire coatings, etc. When desirable, they can be reinforced, e.g., with asbestos fibers.

It is obvious that many variations may be made in the products and processes set forth above without departing from the spirit and scope of this invention.

What is claimed is:

1. A free-flowing particulate blend prepared by intimately mixing 60 to 93 parts by weight of a vinyl chloride polymer having a porosity greater than about 0.1 cc. per gram and containing at least 85 percent by weight of vinyl chloride at temperatures below the fusion point of said polymer with 40–7 parts by weight total of other components comprising (1) an isocyanate-terminated polyester prepolymer which is prepared by reacting substantially linear polyesters with an excess of diisocyanate compound having the general formula:

$$O=C=N-R-N=C=O$$

wherein R is independently selected from the group consisting of alkyl, aralkyl, aryl and alkaryl radicals having from 2 to 14 carbon atoms, said isocyanate-terminated polyester prepolymer having a weight average molecular weight below 5,000, (2) a difunctional organic compound selected from the group consisting of diols, diamines, amino-alcohols and mixtures of the same and (3) tall oil in an amount up to 50 parts by weight per 100 parts of the total weight of the isocyanate-terminated polyester prepolymer and the difunctional organic compound, said other components being liquid at the temperature of mixing.

2. A process for preparing vinyl chloride polymer compositions which comprises mechanically mixing 60–93 parts by weight of a vinyl chloride polymer having a porosity greater than about 0.1 cc. per gram and containing at least 85 percent by weight of vinyl chloride at temperatures below the fusion point of said polymer with 40–7 parts by weight total of other components in liquid form comprising (1) an isocyanate-terminated polyester prepolymer which is prepared by reacting substantially linear polyesters with an excess of diisocyanate compound having the general formula:

$$O=C=N-R-N=C=O$$

wherein R is independently selected from the group consisting of alkyl, aralkyl, aryl and alkaryl radicals having from 2 to 14 carbon atoms, said isocyanate-terminated polyester prepolymer having a weight average molecular weight below 5,000, (2) a difunctional organic compound selected from the group consisting of diols, diamines, amino-alcohols and mixtures of the same and (3) up to 50 parts by weight of tall oil per 100 parts of the total weight of the isocyanate-terminated polyester prepolymer and the difunctional organic compound.

3. The process of claim 2 wherein the substantially linear polyester is prepared by the condensation of glycols and aliphatic polymethylene dicarboxylic acids.

4. The process of claim 3 wherein the glycol is ethylene glycol and the aliphatic polymethylene dicarboxylic acid is adipic acid.

5. The process of claim 4 wherein the diisocyanate compound is 4,4'-diphenylmethane diisocyanate.

6. The process of claim 5 wherein the difunctional organic compound is butanediol.

7. A process for preparing vinyl chloride polymer compositions which process comprises mechanically mixing at temperatures below 100° C., 60 to 93 parts by weight of vinyl chloride polymer having a porosity greater than about 0.1 cc. per gram and containing at least 85 percent by weight of vinyl chloride and gradually adding to said polymer while maintaining continuous mixing 40–7 parts by weight total of other components in liquid form comprising (1) an isocyanate-terminated polyester prepolymer which is prepared by reacting substantially linear polyesters with an excess of diisocyanate compound having the general formula:

$$O=C=N-R-N=C=O$$

wherein R is independently selected from the group consisting of alkyl, aralkyl, aryl and alkaryl radicals having from 2 to 14 carbon atoms, said isocyanate-terminated polyester prepolymer having a weight average molecular weight below 5,000, (2) a difunctional organic compound selected from the group consisting of diols, diamines, amino-alcohols and mixtures of the same and (3) up to 50 parts by weight of tall oil per 100 parts of the total weight of the isocyanate-terminated polyester prepolymer and the difunctional organic compound.

References Cited

UNITED STATES PATENTS

| | | | |
|---|---|---|---|
| 2,851,436 | 9/1958 | Forythe | 360—45.4 |
| 2,872,430 | 2/1959 | Parker et al. | 260—45.4 |
| 2,987,504 | 6/1961 | Wagner | 260—45.4 |
| 3,257,261 | 6/1966 | Hochberg | 260—23 |

FOREIGN PATENTS

| | | |
|---|---|---|
| 226,298 | 1/1960 | Australia. |
| 1,108,785 | 1/1956 | France. |
| 638,118 | 5/1950 | Great Britain. |
| 830,226 | 3/1960 | Great Britain. |
| 884,153 | 12/1961 | Great Britain. |

DONALD E. CZAJA, *Primary Examiner.*

LEON J. BERCOVITZ, JAMES A. SEIDLECK,
*Examiners.*

R. W. GRIFFIN, *Assistant Examiner.*